United States Patent
Holmegaard et al.

(10) Patent No.: US 10,626,241 B2
(45) Date of Patent: Apr. 21, 2020

(54) METHOD AND SYSTEM FOR CLEANING AND UPGRADING POST-CONSUMER AND/OR POST-INDUSTRIAL POLYVINYLBUTYRAL

(71) Applicant: SHARK SOLUTIONS APS, Roskilde (DK)

(72) Inventors: Jens Holmegaard, Holte (DK); Frank Mundt, Samsø (DK)

(73) Assignee: SHARK SOLUTIONS APS (DK)

(*) Notice: Subject to any disclaimer, the term of this patent is extended or adjusted under 35 U.S.C. 154(b) by 117 days.

(21) Appl. No.: 16/006,116

(22) Filed: Jun. 12, 2018

(65) Prior Publication Data
US 2018/0371202 A1 Dec. 27, 2018

(30) Foreign Application Priority Data
Jun. 21, 2017 (EP) .................... 17177131

(51) Int. Cl.
| | |
|---|---|
| C08J 11/06 | (2006.01) |
| C08J 11/08 | (2006.01) |
| B01D 11/02 | (2006.01) |
| B29B 17/02 | (2006.01) |
| B09B 3/00 | (2006.01) |
| C08F 16/38 | (2006.01) |
| C08J 11/02 | (2006.01) |

(52) U.S. Cl.
CPC ........... *C08J 11/08* (2013.01); *B01D 11/0203* (2013.01); *B01D 11/028* (2013.01); *B01D 11/0273* (2013.01); *B01D 11/0296* (2013.01); *B09B 3/0016* (2013.01); *B29B 17/02* (2013.01); *C08F 16/38* (2013.01); *C08J 11/02* (2013.01); *C08J 11/06* (2013.01); *B29B 2017/0293* (2013.01); *C08J 2329/14* (2013.01)

(58) Field of Classification Search
USPC ...................................... 521/40.5
See application file for complete search history.

(56) References Cited

U.S. PATENT DOCUMENTS

| | | |
|---|---|---|
| 5,739,270 A | 4/1998 | Farmer et al. |
| 2009/0209667 A1 | 8/2009 | Thompson et al. |

FOREIGN PATENT DOCUMENTS

| | | |
|---|---|---|
| WO | WO 97/05194 | 2/1997 |

OTHER PUBLICATIONS

Rajesh V. Shende—Supercritical extraction with carbon dioxide and ethylene of poly(vinyl butyral) and dioctyl phthalate from multilayer ceramic capacitors; Journal of Supercritical Fluids 23 (2002) 153-162.
Hui Wang—Extracting Plasticizer from Polyvinylbutyral Plastics by Supercritical Fluid; Advanced Materials Research ISSN: 1662-8985, vols. 550-553, pp. 908-9133.
European Search Report, Application No. EP 17 17 7131.

*Primary Examiner* — Terressa Boykin
(74) *Attorney, Agent, or Firm* — Schmeiser, Olsen & Watts, LLP

(57) ABSTRACT

A method and a PVB cleaning and/or upgrading system for cleaning and upgrading post-consumer and/or post-industrial polyvinyl butyral is provided. The system includes an extraction station for extraction with liquid or supercritical carbon dioxide. The extraction station comprises a sealable container with means for introducing pressurized liquid carbon dioxide into the container and means for stirring PVB material. The station further includes transfer means for transferring the pressurized liquid carbon dioxide containing extracted plasticizer and/or contaminants from the container to a distillation unit. The distillation unit separates extracted plasticizer and/or contaminants from the carbon dioxide, by evaporation of the liquefied $CO_2$. The system further includes pressurizing means, such as a compressor, for pressurizing and liquefying of the $CO_2$ evaporated in the distillation unit.

15 Claims, 4 Drawing Sheets

Figure 2: Modified sequence

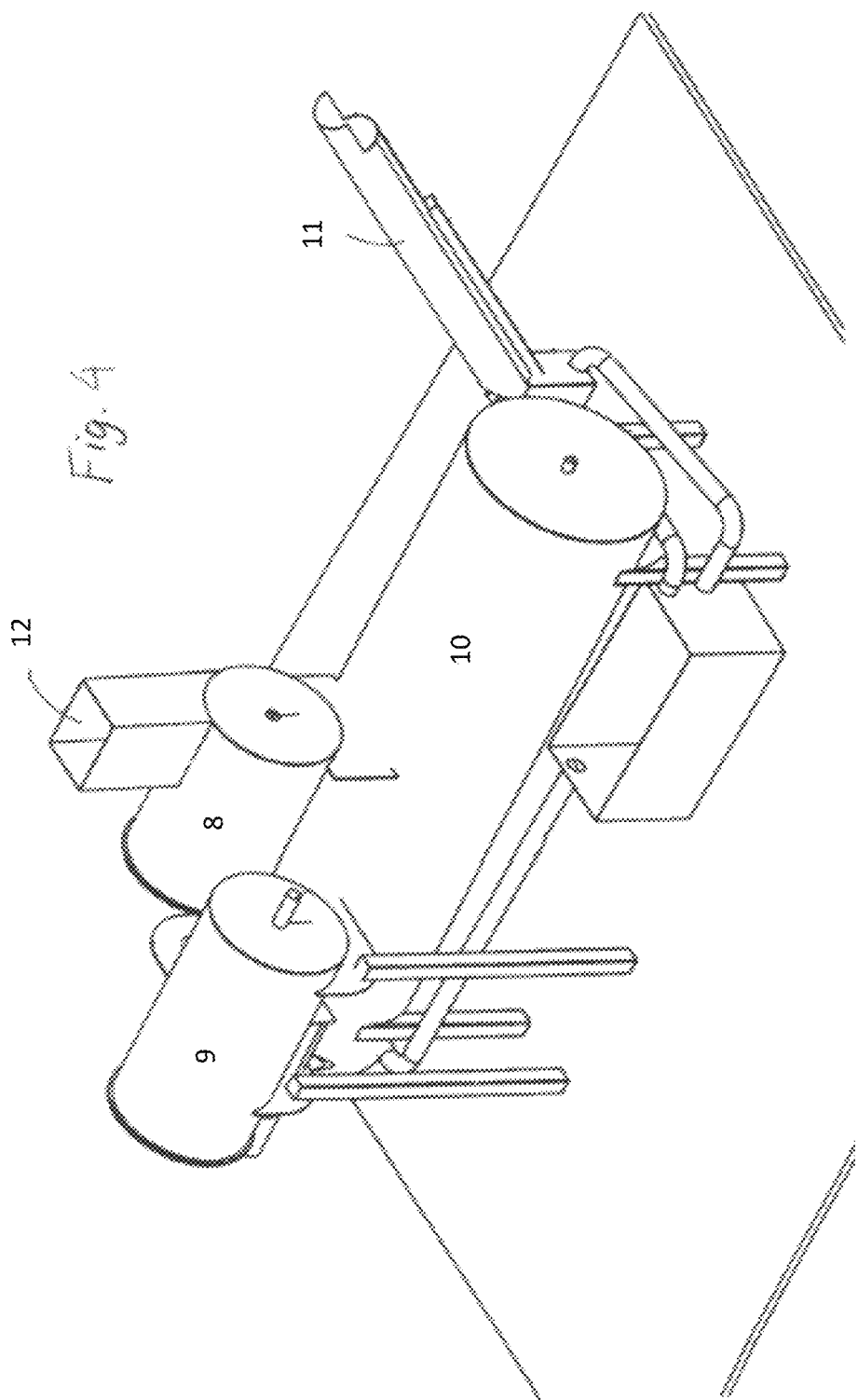

METHOD AND SYSTEM FOR CLEANING AND UPGRADING POST-CONSUMER AND/OR POST-INDUSTRIAL POLYVINYLBUTYRAL

CROSS REFERENCE TO RELATED APPLICATION

This application claims priority to European Application No. EP17177131.4, having a filing date of Jun. 21, 2017, the entire contents of which are hereby incorporated by reference.

FIELD OF TECHNOLOGY

The following relates to a method for cleaning and upgrading post-consumer and/or post-industrial polyvinyl butyral (PVB).

The following also relates to a system for purifying and/or upgrading post-consumer and/or post-industrial polyvinyl butyral (PVB).

The following also relates to a product comprising purified and upgraded post-consumer and/or post-industrial polyvinyl butyral (PVB) obtainable by a method according to embodiments of the present invention.

BACKGROUND

Polyvinyl butyral (PVB, CAS nr 63148-65-2) is a polymer prepared from polyvinyl alcohol by reaction with butyric aldehyde. Plasticized PVB has a glass transition temperature of approximately 10-28° C., depending on the used plasticizer, and other factors. Unplasticized PVB has a glass transition temperature of approximately 62° C. At temperatures well below the glass transition temperature, the PVB becomes glass-like and brittle. Above the glass transition temperature, the PVB material becomes flexible and rubbery Polyvinyl butyral is mostly used for applications where strong adhesion, transparency, toughness and flexibility are required. The major application is laminated glass, in particular, laminated safety glass for car windshields or for use in creating furniture or used in buildings and/or architectural creations. Other emerging applications are protective films e.g. for solar panels.

Common trade names for PVB-film materials include Everlam, KBPVB, Saflex, GlasNovations, Butacite, Winlite, S-Lec, Trosifol and many others.

PVB is a valuable polymer and can be recycled and reused in new applications if the remaining glass particulates as well as components of the PVB fraction, such as plasticizers, degradation products and/or other additives are separated or removed from the recovered PVB fraction prior to reusing in another application. An example of such novel application is by using recovered PVB e.g. as carpet backing material.

Recycling requires effective separation from windshield glass, removal of metal, dust, sand, glass and other particulate materials including also removing colored PVB particles or flakes. Further, certain additives and plasticizers (see definitions above) including VOC's (volatile organic compounds) must be removed as they give rise to negative mechanical properties and negative olfactory sensations, i.e. unpleasant smell, either directly or following sunlight exposure, hydrolysis and/or microbial actions.

In the present application, $CO_2$ or carbon dioxide is to be understood as supercritical $CO_2$, i.e. $CO_2$ above 35° C. and above 70 bars, or liquid $CO_2$, i.e. typically between −20 to +30° C. and at 30-65 bars.

Plasticizer for PVB is in principle any additive which softens PVB and imparts favorable properties for PVB in commercial operations such as intermediate layer in laminated glass, as base polymer in protective films, carpet backing applications or other polymer applications. A well-known plasticizer for PVB is for example TEG-EH (triethylene glycol ester of 2-ethylhexanoic acid).

In the present application the terms degradation products or contaminants encompass the group of compounds that appears when PVB is degraded as already indicated above or especially under humid and weak acidic conditions e.g. because of being stored on a waste tip for windscreens and/or laminate. Similarly, the PVB may be stored on a waste tip after the laminated glass products have been subjected to preliminary separation step resulting in a glass fraction and a PVB fraction containing the PVB interlayer including some glass particles.

The group of compounds that appears upon degradation comprise mostly butyric acid, butyric aldehyde, butoxyethanol, polyvinyl alcohol monomers and oligomers, but may also encompass other degradation products that are presently not identified.

Treatment of polymers in high pressure fluids such as liquid $CO_2$ or supercritical $CO_2$ is well known. Specifically, for PVB, U.S. Pat. No. 5,739,270 B (Farmer et al, assigned to CF Technologies) teaches the extraction of plasticizer and separation of undesired particles and materials from liquid PVB fractions using "critical" (liquid) or supercritical $CO_2$. Further, in order to prepare a liquid PVB composition, an organic solvent (described as a "cosolvent"), such as methanol, acetone or similar is added to the PVB fraction in which "which at least partially dissolves the polymer". The purpose of adding the cosolvent is to reduce the viscosity of the polymer slurry in order to allow subsequent filtration. The use of organic solvents in the PVB recovery process results in a health risks in relation to the workers who are working in the facility where the PVB recovery is performed. This health risk and general risk of leakage is increased since the $CO_2$ extraction is carried out at relatively high pressure because of the use of liquid or supercritical $CO_2$. In addition, the use of organic solvents may also cause an increased risk of fires in case of leakage of organic solvents.

Thus, the currently available recovery and upgrade methods provide a product that is ready for reuse, but the recovery methods suffer from serious drawbacks:
i) organic solvents are required, and their use is increasingly being viewed as unacceptable and too costly,
ii) ii) the $CO_2$ extraction is lengthy remove plasticisers. Besides the cosolvents need to be properly separated from the upgraded PVB in order to ensure that the resulting upgraded PVB fraction does not contain organic solvents that evaporate and cause fire/and/or health risks,
iii) in practice the level of extraction of plasticisers cannot be controlled, with the risk of being forced to add necessary plasticizer after the process. This may include using expensive twin-screw extruders.

In general, the proposed technology in U.S. Pat. No. 5,739,270 B is too costly and too time consuming in view of normal economic considerations.

Thus, there is a need for alternative solutions for upgrading PVB post-industrial and/or post-consumer waste fractions of PVB, e.g. from interlayers of laminated glass or other applications to provide a recovered product which is applicable for reuse in other industries or for reuse in preparing new laminated glass products.

SUMMARY

An aspect relates to an alternative method and a system for upgrading PVB post-industrial and/or post-consumer waste fractions of PVB, e.g. from interlayers of laminated glass or other applications to provide a recovered product which is applicable for reuse in other industries or for reuse in preparing new laminated glass products.

A further aspect is to provide an alternative method and a system for upgrading PVB post-industrial and/or post-consumer waste fractions of PVB, in which health risks for the workers and/or other environmental risks, including fires, are greatly reduced or even eliminated.

A further aspect is to provide an alternative method and a system for upgrading PVB post-industrial and/or post-consumer waste fractions of PVB in which the remaining content of plasticizers cannot be controlled and targeted to novel uses of the recycled PVB fractions.

A further aspect is to provide an alternative method and a system for upgrading PVB post-industrial and/or post-consumer waste fractions of PVB upgraded PVB fraction that does not contain organic solvents or traces thereof arising from the recovery process.

These aspects are achieved by means of a method for cleaning and/or upgrading post-consumer and/or post-industrial polyvinyl butyral (PVB), in particular, PVB material having served as interlayer in laminated glass products, wherein the PVB material is provided in flakes, said method comprising the following steps:
  a) $CO_2$-extraction of the PVB flakes in a stepwise manner to reduce or eliminate the content of plasticizers and/or contaminants such as TEG-EH, 2-butoxy-ethanol, butyric acid, and/or butyric aldehyde present in the PVB flakes subjecting the PVB flakes to extraction with pressurized liquid carbon dioxide at a pressure of between 30 and 70 bars, preferably between 40 and 60 bars, and at a temperature between $-20°$ C. to $+30°$ C., and
  b) Optionally repeating the extraction step a) at least once more.

Hereby is obtained an economic process for rendering PVB residual materials ready for recycling.

The following takes advantage of the fact that the PVB flakes are relatively stiff but flexible at the applied process conditions, which are below the glass transition temperature. This allows that the PVB flakes are also effectively subjected to mechanical action during the upcycling procedure, which causes bending and/or twisting of the flakes during the mechanical action. This provides an effective upcycling of plasticized PVB and an effective extraction of plasticizers. The plasticized PVB is non-sticky, glassy and more brittle at temperatures below the glass transition temperature, and the PVB flakes are flexible. This glass-transition window for plasticized PVB is diffuse, i.e. may vary depending on e.g. the plasticizer used, and self-adhesion between PVB flakes is markedly higher over $28°$ C. Thus, in order to ensure that the PVB flakes obtain a uniform quality throughout the relevant batch and in order to ensure the $CO_2$ extraction is efficient, it is important to provide process conditions where the PVB flakes are non-sticky.

In particular, the method provides an efficient method for controlling the level of residual plasticizer present in the PVB material, because the level of extraction of plasticizer can be easily controlled by the process. The level of extraction of plasticizer is controlled by adjusting the duration of the extraction steps and/or by increasing or reducing the number of repetitions of the extraction steps to reach a targeted residual content of plasticizer n the PVB flakes. Thereby the PVB material can be upgraded in a manner which is targeted towards the process in which the PVB material is to be reused instead of virgin PVB. This also results in that the subsequent user of the recycled PVB may select a targeted level of plasticizer so that he can reuse the PVB material directly in his or her production system.

Alternatively, the subsequent user can easily adjust the level of plasticizer and/or select a specific plasticizer, and/or other additives, such as colorants, UV protective compounds, antioxidants, stabilizers, antimicrobial agents etc. according to his production standards and/or product standard.

Thus, the recovered PVB material may be adapted to meet certain mechanical properties and/or other characteristics and thus tailored to be suited for various uses, such as laminated glass to all-round industrial purposes.

The following is also useful for purification and/or recycling of related polymers/polymer blends as polyvinyl chlorides (PVC), poly urethanes (PU) and/or Acryl butadiene styrene polymers (ABS) available as waste streams, e.g. compounded and chemically filled polymers in carpets, shoes, or other composite products made with PVB, thereby ensuring better recycling after product EOL (end of life).

In one embodiment, a part of the PVB stream being processed may be virgin PVB. Virgin PVB may e.g. be surplus PVB residues that are cut away from a final product, such as surplus PVB cut away from the edges of a laminated glass product.

In addition, the technique for cleaning recycled PVB is also useful for recovering valuable additives such as plasticizers, antimicrobial agents, colorants and antioxidants, optionally after separating the extracted fraction into separate components.

Further, embodiments of the present invention provide an environmental friendly method of purifying and/or upgrading PVB materials, because it eliminates the use of organic solvents, such as described in U.S. Pat. No. 5,739,270 B above.

The pressure at which the $CO_2$ is applied to the extraction process may be reduced, which results in rather large cost savings when establishing the process equipment, in particular, the pumps and/or the extraction device. Pumps with a lower maximum output pressure may be used which also reduces running costs, because less costly pumps may be applied for pressurizing the $CO_2$. In addition, the safety requirements for the extraction vessel are reduced because a lower pressure is required. This also reduces the initial costs for establishing the $CO_2$ extraction system and further reduces safety risks for staff members working near or around the extraction system.

In addition, embodiments of the present invention provide an efficient removal of contaminants which can give rise to unpleasant smell, in particular butyric aldehyde, butoxyethanol, polyvinyl alcohol monomers and/or oligomers as mentioned above. In addition, embodiments of the present invention provide a possibility for chemical conversion of said contaminants to non-smelling and unharmful materials.

It is preferred to apply liquid $CO_2$ in the $CO_2$ extraction step(s). Important advantages of using liquid $CO_2$ versus supercritical $CO_2$ are:
a) process equipment is significantly cheaper,
b) the process is faster as pressure build-up and depressurizing is faster, c) extraction of undesired molecules is efficient and quantitative if needed,
d) CO2 loss is minimal, and/or
e) undesired or valuable contaminants are recovered in pure form.

Further, several other components and/or additives which may be present in the PVB material, such as UV-filter and/or protecting components, colorants, antioxidants, stabilizers, antimicrobial agents or the like, which may be used to provide glass laminates having a certain color or other property is reduced in content when the PVB material is subjected to the method according to embodiments of the present invention, even though the nature or the amount of these additional components are unknown.

Thus, embodiments of the present invention provide the possibility of standardizing and/or stabilizing and or preparation of an upgraded recyclable raw PVB material, which is stable. By stable is meant that the upgraded PCB material is provided with contents of plasticizer and/or a residual level of contaminants in well-defined and reproducible ranges as required for a given application.

When the PVB material is the interlayer of laminated glass products, such as car windshields, the PVB material is in a step or steps preceding the present method subjected to separation from glass layers, e.g. by grinding and a following separation into a glass fraction and a PVB interlayer fraction. This is done by using already known and existing systems or methods. For example, the grinding step or steps with subsequent separation of the glass fraction and the PVB interlayer as described in WO2008/000273 A, which is incorporated herein by reference, may be used for separation of glass and PVB.

In addition, the PVB material is preferably further prepared to the method according to embodiments of the present invention by removing any further potential unwanted matter and/or particulates such as glass residues, dirt, soil or other organic waste material, dust, metal, rubber strips, silicone residues, glue residues or the like in one or more preceding treatment step(s). This can be done by manual and/or automatic means, e.g. by magnetic separation, washing, preferably as described in WO2008/000273 A, and/or other conventional methods.

In addition, in the PVB material may further be prepared for the extraction with CO2 by reduction the average size of the PVB material to provide flakes of PVB. The PVB material is preferably processed to provide flakes with an average size of an average length and/or an average width, which is 4-50 mm, such as 5-35 mm, or preferably 5-25 mm, in particular, 10-20 mm.

This range of the size of the flakes provides the PVB material in a state, in which a combination of extraction with CO2 together with the mechanical action provided on the PVB material during extraction as described below results in fast and efficient extraction of the plasticizers and/or contaminants from the PVB flakes.

The extraction step or steps a) is preferably carried out for 1-15 minutes, or 2-10 or more preferred for 3-8 minutes, or, in particular, 4-6 minutes. The duration of the extraction step a) may be adjusted to provide a defined level of residual plasticizer and/or residual content of contaminants as defined according to the subsequent use of the resulting upgraded PVB material.

It may be preferred to apply an initial step of subjecting the PVB flakes to a vacuum treatment step prior to the CO2 extraction step. The vacuum step may be provided by applying a vacuum pump which can apply a vacuum to the extraction vessel. Thus, the vacuum is applied when the PVB flakes have been loaded into the extraction vessel loading of the extraction machine.

Preferably, a vacuum of 0.001-0.5 bars absolute or below, or preferably 0.05-0.2 bars is maintained for a period of about 15 seconds to 2 minutes, e.g. 0.5-2 minutes, which is surprisingly efficient. The initial vacuum step is useful for the removal of volatile materials exerting partial pressures of below approx. 2 mm Hg at the glass transition temperature of PVB. In particular, 2-butoxy-ethanol appears to be removed efficiently by applying this initial vacuum step. Without wishing to be bound by speculation, it is believed that the pressure gradient within the PVB flakes may also facilitate migration of other smaller molecules (molecular weight <300) to the surface from where subsequent CO2 extraction is more effective. In this sense, the combination of vacuum and subsequent liquid CO2 application is highly useful.

The pressure of CO2 may preferably be modified during at least one extraction step, such as by changing the pressure of CO2 with at least +/−0.1 bars-5 bars, preferably +/−0.1-2.0 bars or more preferred +/−0.1-0.5 bars, during at least one of the extraction steps. This may be accomplished by gas removal or gas compression, in order to create a pressure gradient within the PVB material. This may further result in facilitating the extraction of compounds. The improved extraction is believed to occur due to interstitial migration occurring because the pressure is varied during the extraction step or steps.

The extraction step or steps a) may be repeated at least two times, such as repeated at least 2, 3, 4, 5, 6, 7, 8, 9, 10, 11, 12 times or sometimes even more times. The number of repetitions of the extraction step c) may be adjusted to provide a defined level of residual plasticizer and/or residual content of contaminants as defined according to the subsequent use of the resulting upgraded PVB material.

Alternatively, both the number of repetitions as well as the duration of the extraction step or steps a) may be varied according to the desired level of residual content of plasticizer and/or the number in which the extraction step is repeated.

As mentioned above The CO2 extraction step(s) are carried out while also subjecting the PVB flakes to mechanical action. The mechanical action is, e.g., be provided by conducting the CO2 extraction in a pressure tight enclosure equipped with a rotating drum, a stirred container or where the PVB material is stirred by means of the CO2 flow into the container, such as a fluidized bed. The use of other CO2 agitation systems may be preferred in the specific washing process.

The PVB is provided as flakes and are preferably subjected to mechanical impact or provided during the CO2 extraction step. This results in stirring and bending and mechanical working the PVB flakes. This is believed to promote that the CO2 diffusion into the PVB flakes increases during extraction. This increased diffusion of CO2 into the PVB material leads to an improved CO2 extraction of plasticizer and other organic components. In addition, the extraction is provided evenly throughout the treated batch of PVB, thus providing a predictable and controllable quality of the treated PVB product. Thus, the recycled PVB product obtained can be produced to a specific reuse, because it is possible to control the remaining concentration of plasticizer, in particular, but also in relation to other additives such as colorants, anti-microbial agents etc. as described above. In addition, the duration of the CO2 extraction steps may thus be reduced significantly.

The following also relates to a PVB cleaning and/or upgrading system for cleaning and upgrading system post-consumer and/or post-industrial polyvinyl butyral (PVB), in particular, PVB material having served as interlayer in laminated glass products, wherein the system comprises an extraction station for extraction with liquid or supercritical carbon dioxide, having a sealable container with means for introducing pressurized liquid carbon dioxide into the container and preferably means for subjecting PVB material to mechanical stirring, such as by the sealable container being a rotating drum, in particular, a drum rotating about a horizontal or inclined axis, or by stirring, such as by mechanical stirring means or stirring caused by the flow of liquid carbon dioxide from the pressurized liquid carbon dioxide introduction means, transfer means for transferring the pressurized liquid carbon dioxide containing extracted plasticizer and/or contaminants from the container to a distillation unit, a distillation unit for separating extracted plasticizer and/or contaminants from the carbon dioxide, by evaporation of the liquefied $CO_2$, and pumping means for pressurizing and liquefying of the $CO_2$ evaporated in the distillation unit, and recirculation means for recirculating the liquefied and pressurized $CO_2$ to the sealable container.

Hereby is obtained a system that can provide the effective combination of extraction with liquid or supercritical carbon dioxide while also subjecting the PVB flakes to mechanical action. The system is in particular very useful in the above-mentioned method and obtains the above-mentioned advantages.

The extraction station comprises a sealable container, such as a rotatable drum, provided inside a sealable vessel. Alternatively, the sealable container comprises a vessel with mechanical stirring means, e.g. a rotating paddle. The sealable container may also comprise carbon dioxide introduction means, nozzles or the like, which introduce the liquid carbon dioxide into the sealable container in a manner that ensures effective stirring or even fluidizes the PVB flakes in the liquid $CO_2$.

The sealable container is preferably a rotating drum rotating about a horizontal or inclined axis, because this provides effective mechanical action and at the same time also provides effective mixing and thus effective contact between the liquid $CO_2$ and the PVB.

$CO_2$ is provided from the first $CO_2$ storage container, which contains liquid recycled $CO_2$. In order to compensate for any potential loss of $CO_2$, which may be withdrawn from the system together with either the treated PVB flakes and/or with the extracted compounds that are ejected from the distillation column as mentioned further below.

The sealable container may comprise temperature adjusting means, such as a heating surface or the like or similar to adjust the temperature within the sealable extraction vessel to provide the above-mentioned temperatures during $CO_2$ extraction of the PVB flakes.

The heating media may be or gaseous $CO_2$, which is taken from the $CO_2$ circulation path, compressed in a compressor to liquid $CO_2$ and increase the temperature and circulated through the heating coil in the sealable extraction vessel.

The extraction station may further comprise transfer means for transferring the pressurized liquid carbon dioxide containing extracted plasticizer and/or contaminants from the sealable container to a distillation unit. A piping between the sealable container and the distillation unit is provided to transfer the liquid carbon dioxide containing extracted plasticizer and/or other extracted compounds.

Preferably, the liquid carbon dioxide phase is discharged to a distillation vessel from which purified $CO_2$ is recovered and subsequently recycled into the extraction unit. The pressure difference between the pressurized vessel having a higher pressure (in which $CO_2$ extraction of PVB occurs) and the distillation vessel, which is kept at a lower pressure, is usually sufficient to ensure that the liquid $CO_2$ fraction containing the extracted compounds is sucked from the pressurized extraction vessel to the distillation vessel. Alternatively, pumping means are provided for transfer of the liquid $CO_2$ to the distillation unit.

Similarly, the distillation unit comprises temperature adjusting means, such as a heating surface or the like or similar to adjust the temperature within the sealable extraction vessel to provide the above-mentioned temperatures during $CO_2$ extraction of the PVB flakes.

The heating media may also here be or gaseous $CO_2$, which is taken from the $CO_2$ circulation path, compressed in the compressor to liquify the $CO_2$ and to increase the temperature and circulated through the heating coil in the distillation unit. The heating media provided to the distillation unit may be heating media from the sealable extraction vessel, heating media from the compressor unit and/or a mixture thereof. This provides efficient utilization of the thermal energy and thus ensures low power consumption and low production costs.

Preferably, the contaminants are removed from the $CO_2$ by evaporating the liquid $CO_2$ from the process in a separate distillation vessel, e.g. by heating the vessel and/or reducing the pressure thus leaving the contaminants in the vessel. The pressure is lowered to a level of 20-25 bars. During decrease of the pressure, the temperature also drops. Thus, in order to maintain approximately constant temperatures in the distillation unit during separation of $Co_2$ and the extracted substances, additional heat may be added. The heat may be transferred by means of a heating jacket and/or a heating coil. Heating may be applied by one or more electrical heaters or by means of a heat transferring fluid circulating through the heating jacket and/or the heating coil.

The $CO_2$ is efficiently reutilized by liquefying the gaseous distillate, which comprise almost pure $CO_2$. The gaseous $CO_2$ may be liquefied by compression in the above-mentioned compressor to a pressure of between 30 and 70 bars, preferably between 40 and 60 bars. When compressed and in liquid form, the $CO_2$ may be recirculated into the sealable extraction vessel, or stored in a first CO storage container used for storing recycled liquid $CO_2$.

If necessary, the temperature is lowered using a heat exchanger to adjust the temperature of the liquid $CO_2$ prior to storage in the first $CO_2$ storage container. The heat exchanger may in its most simple form comprise an air blower that ejects heated air to the surroundings.

The contaminants are then transferred from the distillation vessel and into a storage tank in which a pressure close to atmospheric pressure is applied. The blow-out is easily done by opening a valve and using the remaining pressure in the distillation vessel to blow the liquid contaminant out of the distillation vessel and into the storage tank.

This procedure is simple and effective, but may in some situations be less preferred, in particular, if the contaminant is very soluble in $CO_2$. Then liquid $CO_2$ will also be blown out of the distillation vessel and is removed or blown out together with the contaminant. This may which cause dry ice formation when introduced into atmospheric pressure as well as significant $CO_2$ losses.

Therefore, it is preferred to remove the contaminants from the CO2 process by blowing the contaminants into a pressurized separation vessel. The pressurized vessel is preferably operated at a pressure of above 5 bars above atmospheric pressure to avoid dry ice formation. The contaminants will then precipitate and settle at the bottom of the pressurized vessel. Here the contaminants are heated to ambient temperature. The contaminants can easily be removed by opening a valve in the bottom of the vessel. The gaseous CO2 in the pressurized vessel can then be re-used in the extraction steps by initiating the step by transferring the gaseous CO2 from the pressurized tank CO2 machines process vessel for the next batch when starting to pressurize the extraction vessel. In this way the initial pressure increase, e.g. up to between 0 and 5 bars, are caused by recycling the recovered gaseous CO2 from the pressurized vessel.

In one embodiment, following one or multiple extraction steps with liquid CO2 and/or during the last part of the last of the CO extraction steps, additives, which are selected depending on the subsequent use of the PVB material, may be pumped into the CO2 extraction vessel. Said additives including antioxidants, anti-microbial agents, colorants, plasticizers and/or others depending on the subsequent use of the recycled PVB that is treated. When pumped into the CO2 extraction vessel, which contains liquid CO2, the additives are distributed on the PVB surface and may also migrate into the polymer matrix, e.g. by using the CO2 as carrier. Said method of additive addition in combination with the extraction in the CO2 vessel is cheap and time-effective.

The method preferably further comprises the step (c) in which the PVB material washed with water adjusted to alkaline pH of at least pH above 8, preferably a pH of at least 9-14 or above, such as a pH of at least 11-14 or above.

Similarly, the PVB cleaning and/or upgrading system may further comprise an alkaline washing fluid addition means for adding alkaline washing fluid to the pressurized container or to a separate alkaline washing means.

It is preferred that the alkaline washing means are provided as a separate unit, which provides the alkaline washing step prior to subjecting the PVB flakes to CO2 extraction.

The alkaline washing step results in that certain contaminants are easily extracted from the PVB material, in particular, butyric acid, which is surprisingly easily removed by a combination of at least one alkaline washing step with at least one subsequent CO2 extraction step. At least a part of the butyric acid is thus easily leached from the PVB flakes during the alkaline washing step or converted within the PVB flakes to dissolvable salts of butyric acid, which are then washed from the PVB flakes during the alkaline washing step. In the following CO2 extraction procedure, the level of butyric acid is then lowered even further to below the olfactory detection level, i.e. below approximately 1 ppm.

In addition, the alkaline washing step ensures that microscopic glass residues and/or other microscopic contaminants are easily removed from the PVB material. The surface of the PVB material comprises hydroxyl groups. During the alkaline washing step, the surface saturates with hydroxyl groups. This increase in the amount of hydroxyl groups on the PVB surface influences the binding between glass and the PVB polymeric material, and thus promotes that any microscopic glass residues and/or other microscopic contaminants are easily released from the surface of the PVB material.

The alkaline washing step is preferably performed with water adjusted to alkaline pH by adding an inorganic or organic alkaline hydroxide, e.g. sodium hydroxide (NaOH), potassium hydroxide (KOH), calcium hydroxide (CaOH2), sodium carbonate (Na2 CO3), potassium carbonate (K2CO3), ammonia and/or mixtures thereof.

The alkaline washing step is preferably performed at temperatures never over the glass transition temperature of PVB, i.e. at or below approx. 28° C., such as 10-28° C. or preferably 12-22° C. As mentioned above the PVB is non-sticky, glassy and more brittle at temperatures below the glass transition temperature, and the PVB flakes are flexible. This glass-transition window for plasticized PVB is diffuse, i.e. may vary depending on e.g. the plasticizer used, and self-adhesion between PVB flakes is markedly higher over 28° C. Thus, in order to ensure that the PVB flakes obtain a uniform quality throughout the relevant batch and in order to ensure the above-mentioned removal of micro glass particles, this is important to provide process conditions where the PVB flakes are non-sticking within the alkaline wash-process.

The alkaline washing step preferably also comprises mechanical stirring or similar mechanical action that causes a mechanical impact and causes the glassy PVB material to bend during the alkaline washing step. The mechanical impact provided during the extraction step results in bending and mechanical working the PVB material.

It is believed that this mechanical action results in that micro cracks, which may be present in the surfaces of the PVB material are opened during bending of the PVB material. This is believed to promote that any microscopic glass residues and/or other microscopic contaminants trapped in these micro cracks are easily washed out during the alkaline washing step. Thus, when the alkaline washing step is performed prior to the CO2 extraction step, the remaining glass particles are also effectively removed, resulting in a reduced the wear on the CO2 extraction equipment and/or reduced risk of malfunction thereof caused by the presence of the (micro) glass particles, leading also to reduced repair and/or maintenance costs on the CO2 extraction equipment.

In addition, the PVB remains non-sticky because the alkaline washing step is performed at temperatures below the glass transition temperature. This further improves that the PVB material easily releases the particulate contaminants such as microscopic glass residues and/or other microscopic contaminants.

The action during the alkaline wash relates to the high concentration of hydroxyl ions present when in the alkaline or strong alkaline pH. The hydroxyl ions are responsible for at least partial saponification of oily or fatty-substances found in the waste PVB, but also to react with degradation products of same kind, as also butyric acid, and acids as citric acid used as adhesion controllers in the PVB for lamination. Furthermore, the high hydroxyl ion concentration saturates the surface of the PVB, also being hydroxylic, so that the adhesion towards glass particles and fragments lowers and makes them washable. It has been found that this combination of effects of vigorous agitation and alkaline washing are best obtained at the above-mentioned temperature and pH intervals. be vigorous and constant, pH>9.0 preferably >11.0, and the temperature 12<t<22 deg C.

The constant stirring of the hydroxyl ion rich washing solution with the PVB flakes increases the area exposed to air and the degradation of hydroxyl salts towards carbonate salts takes place. This enables harvesting CO2 from the atmosphere until the usability limited by pH=9 is reached. This effect does not influence the washing result, and for some applications the sodium carbonate rich solution thus obtained will also be suitable for a prewash of particularly polluted PVB waste material.

The alkaline washing step c) is preferably performed prior to and/or subsequent to the CO2- extraction step.

The alkaline washing of the PVB material may be performed in continuous manner or batch wise. There may be a temporary storage between the alkaline washing step and the CO2 extraction steps.

It is preferred to perform the alkaline washing step prior to the CO2 extraction step because the amount of butyric acid is already significantly reduced and thus does not need to be extracted during the CO2 extraction step The initial alkaline washing step may be performed in the washing part and optionally the subsequent flushing step of the apparatus and a washing process according to WO 2008/000273A, which is also incorporated herein by reference, with the provision that the washing step is alkaline as discussed above.

In some situations, in particular, where butyric acid is only present in low or neglectable amounts, the alkaline wash may be omitted and substituted with a washing with water, such as described in WO2008/000273 A prior to the CO2 extraction procedure.

In some situations, e.g. where relatively pure PVB is recovered for a similar subsequent use, and/or if the PVB material is a pure post-industrial fraction that needs no further alterations than potentially removal of particulate contaminants such as microscopic glass residues and/or other microscopic contaminants, the CO2 extraction mentioned above may be omitted. Thus, in such situations the PVB material is only subjected to alkaline washing besides working up mechanically as already described above. In addition, the subsequent formulation discussed below may also be included to provide the recovered PVB fraction as a ready to use product.

In parallel, there may be situation where the alkaline washing is omitted, and thus only the CO2 extraction step(s) are carried out to reduce the content of plasticizer(s) and/or other additives as already discussed above. This is in particular relevant where the PVB fractions contain very low amounts of particulate contaminants such as microscopic glass residues and/or other microscopic contaminants. This may be the case for post-industrial PVB fractions or e.g. laminated glass, where the glass layers are intact and thus not broken or crushed.

A drying step may be performed after the alkaline washing step or steps. The drying step may e.g. be conventional vacuum drying at reduced pressure, and preferably below the glass transition temperature to avoid that the PVB flakes becomes flexible and rubbery but are maintained in their glass-like and brittle state.

The thus recovered PVB flakes can be converted to a water-borne dispersion e.g. with a dry matter content of around 50% which can be used in applications such as carpet backing, protective film manufacture or the like. The PVB further can be uses as it is in the flakes discussed above and/or converted into as pellets, powder.

Depending on the process choices the physical and chemical properties of the PVB is either unchanged (when only alkaline washed) or changed due to extraction of as example plasticizer, or introduction of new additives during the CO2 washing cycles. No adverse smell is observed even after accelerated ageing or long-term use.

Thus, as outlined above, embodiments of the present invention also relate to a PVB product obtainable by the method according to embodiments of the present invention.

The PVB flakes may e.g. be reused by being ground to powder, and dispersed in a liquid comprising more than 90% by weight water, preferably pure water without organic solvents, or alternatively used as raw material for polymer processing such as pellet or powder production for extrusion or injection molding.

It should be understood that the above described method, apparatus and products are merely examples of useful sequences to achieve the objective of embodiments of the invention, namely to ensure control of waste streams of PVB relating to overall purity, removal of undesired additives and suitability for recycling in new applications.

Similar arrangements should also be seen as falling under the spirit of embodiments of this invention. The experts understand that modified solutions will be used mainly depending on costs/benefits calculations.

In summary, a simple solution is disclosed for removal of undesired additives and chemicals from post-consumer or post-industrial PVB. The solution is inexpensive in construction and operation, and can be operated in vicinity to existing process lines for handling of PVB waste, but also in vicinity to PVB processing, e.g. dispersion lines, or end-user facilities, e.g. carpet or shoe production facilities.

BRIEF DESCRIPTION

Some of the embodiments will be described in detail, with references to the following figures, wherein like designations denote like members, wherein:

FIG. 4 illustrates the equipment used for alkaline washing.

DETAILED DESCRIPTION

Figure 1:
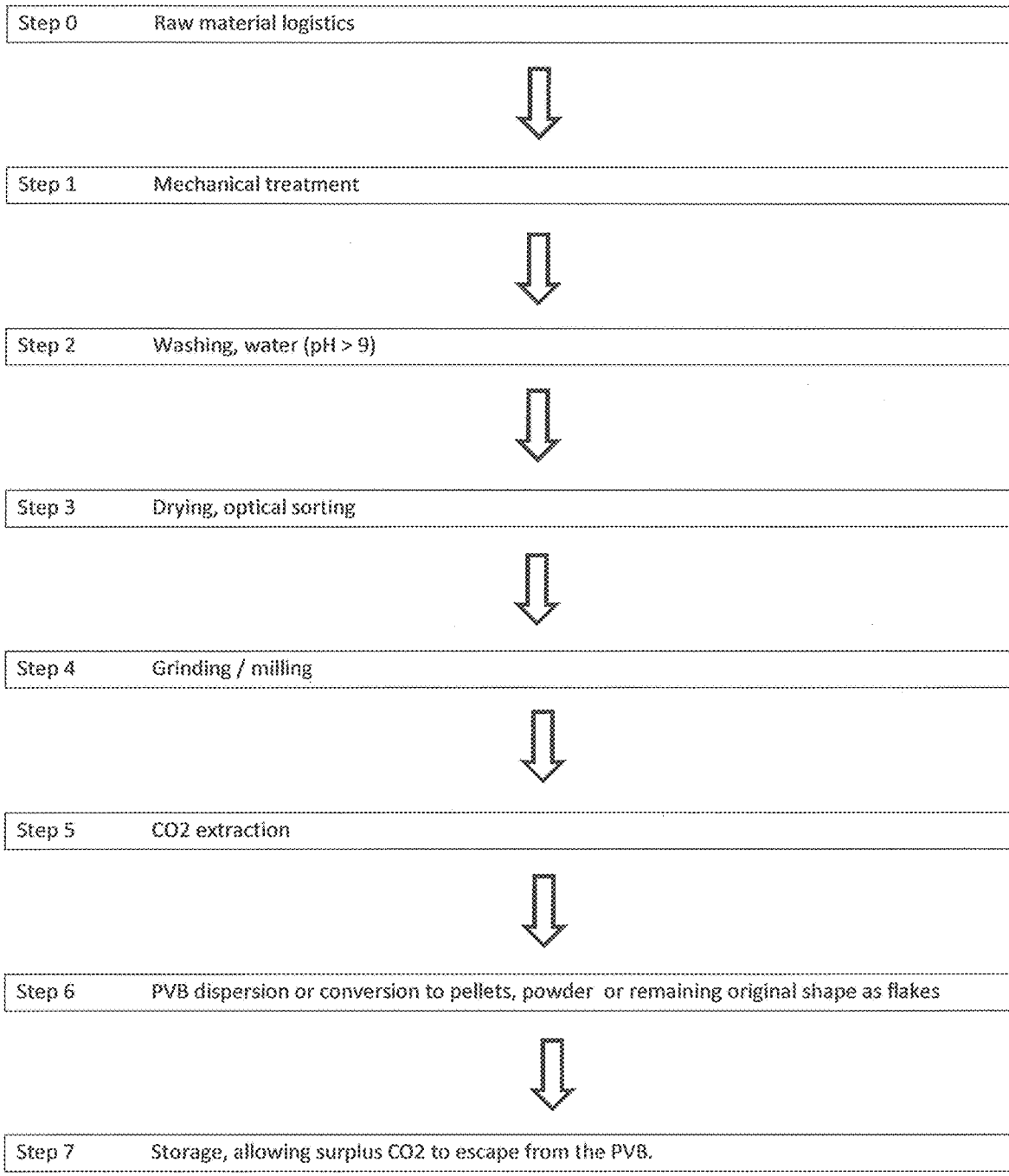
FIG. 1 illustrates a stepwise diagram of variants of the upgrading procedure including stepwise CO2 extraction according to embodiments of the present invention.

FIG. 1 is a schematic drawing of a treatment sequence for PVB.

Step 1 denotes optional initial pre-treatment steps where PVB material is subjected to mechanical treatment and optionally optically controlled treatment which may be required as the case may be. This pre-treatment may, in particular, comprise separation of PVB from particulate matter including, among others, in particular glass, metal, colored PVB. This separation process may be automated or manual as provided at the production facility and may comprise magnetic means, optical recognition, digital image processing systems etc.

Step 2 denotes washing with alkaline water as described above. Step 3 denotes a drying step. Step 4 denotes grinding or milling to reduce PVB size to flakes of a size as also outlined above. Step 5 denotes CO2 extraction of low molecular weight components in one or more substeps. Step 6 denotes the optional final preparation of PVB dispersions or other intermediate products such as pellets or powder or raw material for extrusion.

Figure 2:
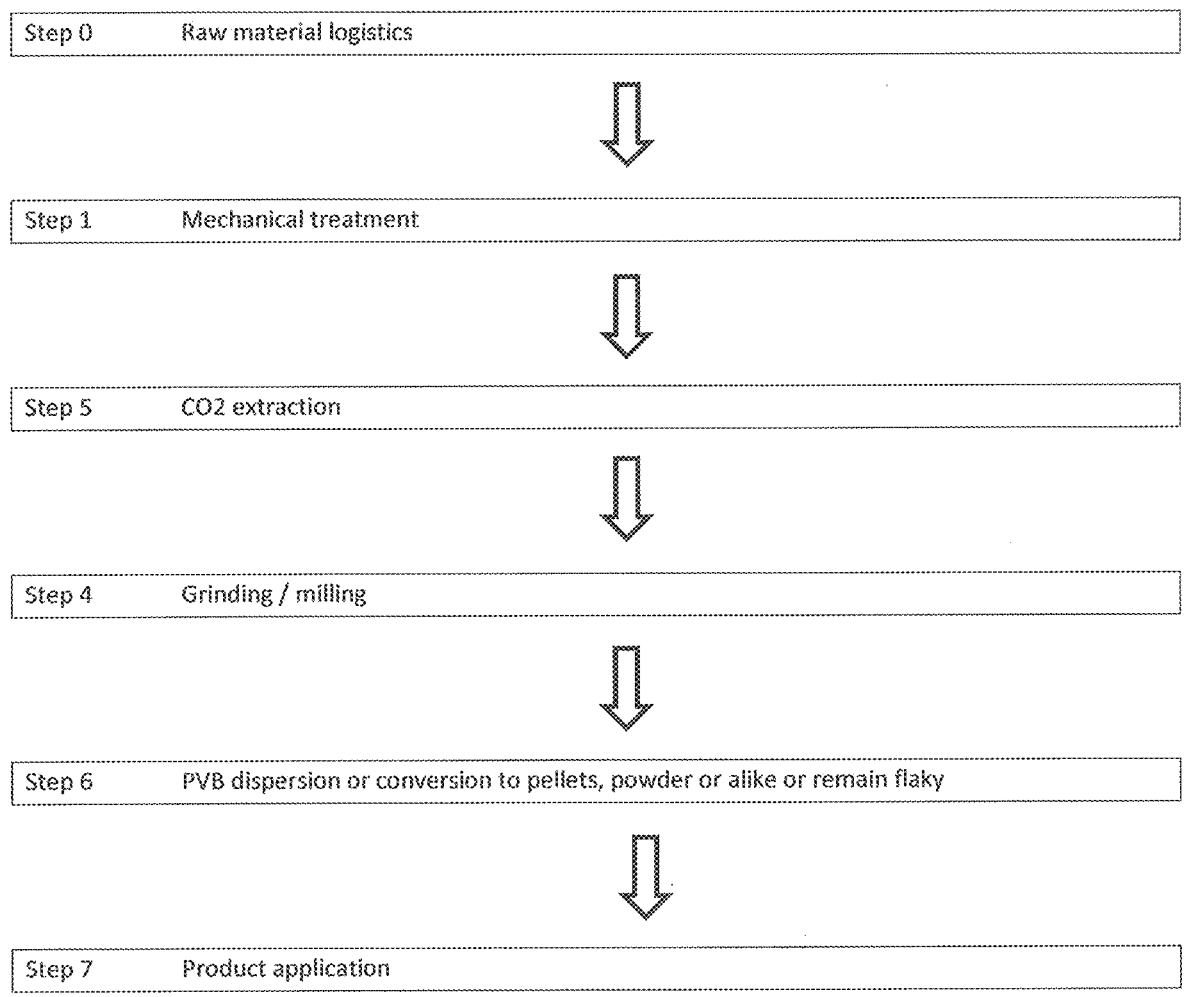
FIG. 2 illustrates an alternative stepwise diagram of variants of the upgrading procedure including stepwise CO2 extraction according to embodiments of the present invention.

FIG. 2 is a schematic drawing of an alternative procedure step sequence of the treatment steps of embodiments of the invention. In this procedure, The CO2 extraction step 5 is performed prior to the alkaline washing step 2, or as shown in FIG. 2, the alkaline washing step 2 may be omitted. One advantage is that drying step 3 may (also) be omitted.

Different alternative sequences are conceivable. For example, the grinding step 4 may be performed after the $CO_2$ extraction step(s). In that case, the PVB flakes are considerably more brittle and easier to mill. On the other hand, small flake size pf the PVB flakes within the above described range is advantageous for the alkaline washing step and/or $CO_2$ extraction as they balance the possibility to bend the flakes during mechanical action and provide particles that are small enough to provide particulate material which is easily handled in conventional production equipment, e.g. conveyors, pipes etc.

In commercial practice, the most cost-efficient solution will be used. In particular, there is an incentive to omit the water washing step as this also avoids the energy-intensive drying step. Further omitting the alkaline washing step and further avoids disposal of water borne residues from the alkaline washing step to the public drains and/or local water treatment or at least pre-treatment of the waste water fraction in order to allow the production site to discharge waste water to the public waste sewage collection and/or treatment systems. The alkaline washing step is for example avoided when relatively pure fractions of PVB are treated, e.g. "virgin" PVB that originates from cut-away surplus PVB from products during manufacturing thereof, e.g. along the edges of a newly produced laminated glass product.

This embodiment is preceded by one or more initial pre-treatment steps. The pre-treatment steps may comprise one or more of the following steps:

Separating PVB interlayers from glass layers in laminated glass, e.g. car windshields or architectural glass or glass used for production of furniture.

Milling to reduce particle size of the PVB fraction and/or the glass fraction, sorting, e.g. sorting metallic fractions, such as aluminium metallic pieces, or sorting undesired coloured PVB material from desired uncoloured PVB material, and/or removal of undesired components, such as separation of the glass fraction from the valuable PVB fraction.

These separations milling and/or sorting steps may be carried out in a known system as discussed in WO2008/000273 A, which is incorporated herein by reference.

A preferred equipment for performing the above-mentioned separation, milling and/or sorting step(s) as well as the alkaline washing step or steps are preferably carried out in a sorting and washing system as shown in FIG. 4, and as is disclosed in WO2008/000273 A. The system comprises four main components: a first process chamber 8, a second process chamber 9, an approximately horizontal washing drum 10 and an upwards inclining screw conveyor 11. Comminute laminated glass produced by a not shown previous process is fed to a funnel or inlet 12 in the facility in chamber 8. Glass and other particles are separated off in chamber 9. The drum 10 and the screw conveyor 11, after which cleaned PVB film pieces are discharged, possibly together with some process water at the outlet. In principle, the four main process steps may be described as coarse comminution of the material in chamber 8, finer comminution of material and separating off heavy particles in chamber 9. Subsequently, the PVB material in the form of PVB flakes or pieces are washed in drum 10 in alkaline water at pH of 11-14 as described above by adding an alkaline washing solution to the drum 10 through not shown inlet means. The alkaline washing solution is discussed above.

After the washing step in drum 10, the PVB flakes are flushing with water, e.g. in the specially designed screw conveyor 11.

The screw conveyor 11 may transfer the PVB flakes into a not illustrated drying unit. Drying may e.g. be provided in an air-drying unit.

The method for the processing of PVB using pressurized $CO_2$ extraction may use supercritical or liquid $CO_2$ in the $CO_2$ extraction step(s). Suitable suitable equipment may be used as described below.

The inventors have found that liquid $CO_2$ between $-20$ to $+30°$ C. and applied at a pressure of 30-70 bars or preferably 40-60 bars while subjecting to mechanical action is highly useful, efficient and, in particular, cost-effective.

Figure 3:
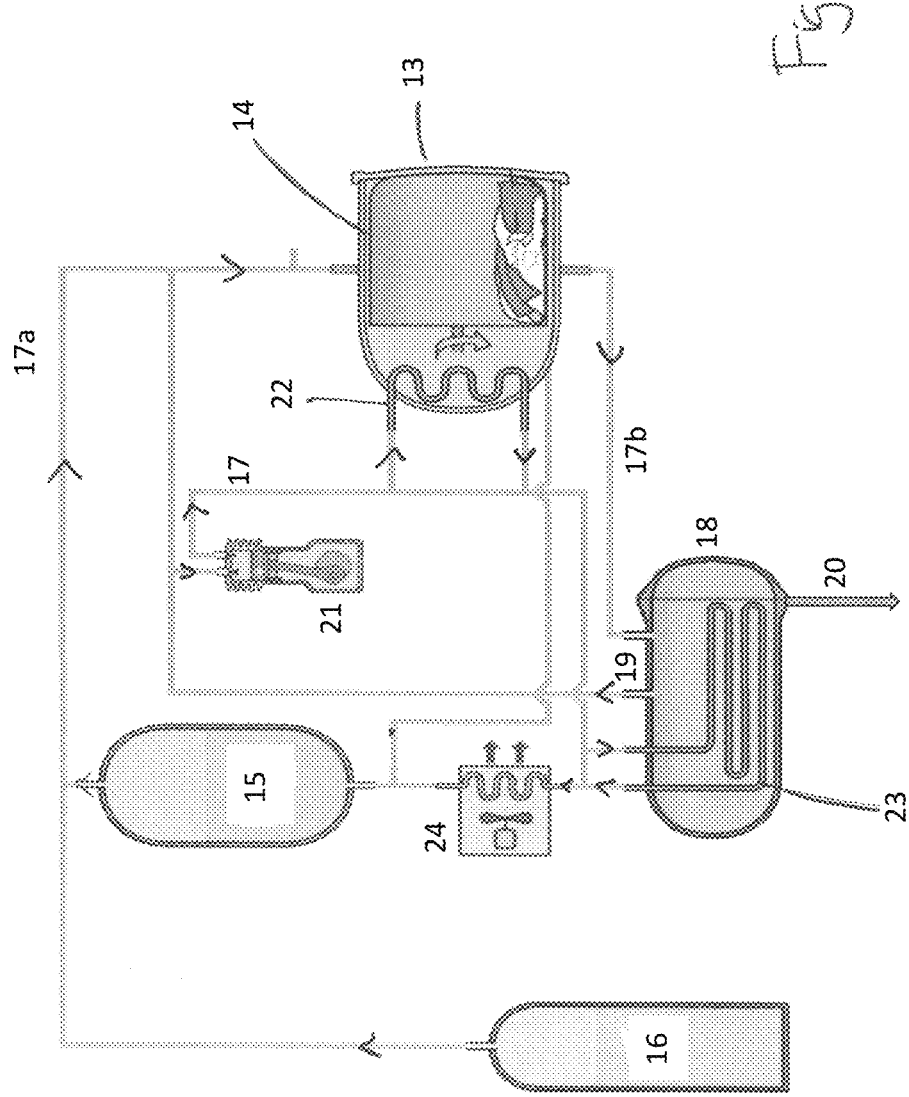
FIG. 3 shows a diagram illustrating a preferred layout of the CO2 extraction equipment according to embodiments of the present invention.

From the washing station or from drying or from intermediate storage after drying, the PVB flakes are subjected to extraction with $CO_2$. A sealable container 13 is provided with stirring means such as a rotating mixer or as shown in FIG. 3 a rotating drum 14. PVB flakes are loaded into the rotating drum, e.g. after being bagged in large textile bags.

The sealable container 13 is sealed and a vacuum is optionally applied as discussed above.

Then pressurized $CO_2$ is supplied to the sealed container 13 through supply pipe 17$a$ from a first $CO_2$ storage 15, which stores recycled $CO_2$. Alternatively, or in combination therewith, $CO_2$ may be supplied from a second $CO_2$ storage or supply 16, e.g. to replenish $CO_2$ that escapes the system with product streams.

The drum 14 is rotated during extraction, and after a time period described above, the liquid $CO_2$, is extracted from the sealed container 13 and transferred to the distillation unit 18.

The liquid $CO_2$ now contains extracted plasticizer, other extracted components, e.g. colorants, and/or degradation products or polluting components etc. from the PVB flakes, such as butyric acid or butyric aldehyde.

The liquid $CO_2$ fraction is subjected to distillation in the distillation unit 18 as described above.

The liquid $CO_2$ is vaporized in the distillation unit 18 and the gaseous $CO_2$ is withdrawn from the distillation unit through a gas outlet 19. The liquid fraction is withdrawn from the distillation unit 18 via a liquid outlet 20.

The liquid fraction may be blown out from the distillation unit 18 to a liquid storage container (not shown) as discussed above.

The gaseous $CO_2$ is then compressed in a compressor 21 to increase the pressure and condense the gaseous $CO_2$ into a liquid.

The compression increases the temperature of the liquid $CO_2$. Thus, the compressed liquid $CO_2$ is supplied to a heater 22, e.g. a heating coil, in the sealable container 13. Similarly, Liquid $CO_2$, which exits the compressor 21 is supplied to a second heater 23, which is provided in the distillation unit 18.

The liquid $CO_2$ from the compressor 21, from the first 22 and/or second 23 heaters is then directed to the first $CO_2$ storage for intermediate storage.

If necessary, the liquid $CO_2$ is cooled in a cooling unit 24 before feeding into to the first $CO_2$ storage container 15.

EXAMPLES

Example 1

50 kg PVB flakes (or an alternative weight as indicated in table 1 below) having an average length and average width of approx. 10 mm are placed in textile bags each comprising 10 kilos of PVB flakes. The bags are sealed and placed in a 200 l pressure tight rotating drum extraction machine, marketed as SiOx P35 provided by SiOx in Sweden. Initially, the rotating drum chamber is evacuated to a pressure of approx. 0.1 bars (absolute) for a period of minimum 30 seconds in order to remove any atmospheric air in the system and to extract and remove volatile compounds such as butoxy ethanol from the PVB flakes.

Prior to CO2-extraction the PVB flakes were subjected to an alkaline washing step in a process equipment as described in WO2008/000273 A. The alkaline washing step is carried out using wash water to which sodium hydroxide was added to obtain a pH of 11-14. In all the examples, a pH concentration of NAOH is adjusted to 11.3±0.1 was used as a washing solution. During CO2 extraction the PVB flakes are treated with approx. 80 liter/70 kg of liquid CO2. The temperature is maintained at 20° C. and the pressure is maintained at 55 bars above atmospheric pressure. The extraction step is carried out for 5 minutes/300 seconds.

The liquid CO2 is then discharged into a distillation vessel from which pure CO2 is recovered into a CO2 storage vessel using a compressor and a cooler, whereas extracted plasticizer is retained in the distillation vessel. From time to time, the plasticizer can be blown out from the distillation vessel from the distillation vessel using the CO2 pressure inside the distillation vessel. The blown-out fraction is then weighed. The main component of the extracted fraction is plasticizer(s).

The CO2 extraction step is repeated 3, 6 or 12 times as indicated in table each example below ("washprogram"/e.g. 3×300 s).

Table 1 below summarizes the results obtained with varying repetitions of a standardized CO2 extraction step which is set to 300 seconds (5 minutes). In all examples post-consumer PVB windshield interlayers were processed.

TABLE 1

| Batch number | "Wash program" (Number, duration of cycles) | Weight | Difference in weight before and after extraction with $CO_2$ | Moisture before extraction with $CO_2$ | Moisture after extraction with $CO_2$ |
|---|---|---|---|---|---|
| #3 | 3 × 300 s | 60 kg | 4.60% | 1.61% | 1.41% |
| #4 | 6 × 300 s | 12 kg | 9.29% | 1.61% | 1.44% |
| #8 | 3 × 300 s | 50 kg | 5.83% | 1.61% | 1.40% |
| #39 | 3 × 300 s | 50 kg | 3.47% | 2.64% | 1.13% |
| #56 | 3 × 300 s | 50 kg | 3.58% | 2.64% | 1.66% |
| #76 | 12 × 300 s | 50 kg | 12.29% | 1.59% | 1.29% |
| #82 | 12 × 300 s | 50 kg | 9.27% | 1.59% | |

About 50% or more removal of the total plasticizer content is obtained in all examples. The treated PVB flakes are non-tacky, easily dispersible, easily grindable and non-smelling.

With a ratio of 6 kg CO2/1 kg PVB using 3 cleaning cycles, the extraction level of approximately 50% by weight reduction of the content of plasticizer is achieved.

Example 2

This example is carried out to check the evaporation of CO2 from the extracted PVB flakes and determine the best possible time at which the weight after extraction can be determined. Samples of extracted batches #3 (1001.5 g) and #82 (1002.2 g) of example 1 were each placed in a container. The moisture content is determined before the extraction and a day after the CO2 extraction (see table 1).

The weight of the PVB sample+filter is noted in table 2.

TABLE 2

| Time (minutes) | Weight (g)- sample #3 | Weight (g)- sample #82 |
|---|---|---|
| 0 | 1009.9 | 1007.7 |
| 5 | 1007.2 | 993.7 |
| 15 | 1001.7 | 976.9 |
| 30 | 992.8 | 961.9 |
| 45 | 987.8 | 951.4 |
| 60 | 981.4 | 944.2 |
| 90 | 973.7 | 933.4 |
| 120 | 967.9 | 926.0 |
| After 1 day | 955.4 | 908.6 |

This example shows that CO2 is present in the flakes after extraction with CO2. This CO2 and diffuses into the surrounding air for at least a few hours. Thus, in order to determine the most precise extent of extraction of plasticizer, it is preferable to wait for at least one day before determining the weight of the PVB flakes after the CO2 extraction program.

Example 3

Flakes of PVB obtained from a specific constant source were extracted in a process using 3×300 second extraction cycles as described in example 1. (Batch #1-#3; Batch #5-#37, Batch #53-#54).

We have weighed these flakes before extraction, 1867 kg, after and the "washed"/extracted flakes after two days, 1754 kg. The difference in weight between untreated and washed with an extraction program of 3×300 s is 113 kg less. This is 6.04% by weight less.

Example 4

Example 2 was repeated with the exception that the extraction with CO2 was carried out in 12×300 seconds cycles. PVB is flakes of same origin (Batch #71-#87)

We have weighted the PVB flakes before treatment, 900 kg, and after two days subsequent to CO2 extraction, 790 kg. The difference in weight between untreated and treated flakes with an extraction program of 12×300 s is 110 kg less. This is 12.22% by weight less than before extraction.

The weight of the extracted plasticizer withdrawn from the distillation column after treatment of batches #71-#87 is 46 kg.

Example 5

A sample of batch #4 as mentioned above in table 1 was evaluated manually prior to treatment. The sample was dirty and was clearly covered with algae and colorations that indicated other microbial growth. The entire sample had a very clear smell of butyric acid. The residual glass content in batch #4 was determined to 4.5% by weight.

The content of glass residues in the batch was determined by burning of a pooled sample of smaller samples taken evenly throughout the batch. The pooled sample was weighed and the PVB was burned off by means of a gas flame using a conventional Bunsen burner. The glass residues were weighed.

Samples of batch #4 were taken after above mentioned CO2 extraction procedure. The content of potential contaminants butyric acid (CAS: 107-92-6), 2-butoxy ethanol (CAS: 111-76-2) and butylated hydroxytoluene (BHT; CAS: 128-

137-0), an anti-oxidant used in PVB, was analyzed by means of gas chromatography in the approved laboratory CENTEXBEL, in Belgium.

The amount of butyric acid, butoxy ethanol and BHT was determined to the following amount (in % by weight):
Butyric acid: N/D (below detection level)
Butxy ethanol: 0.0024% BHT: 0.08%
The detection level is 0.001%.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for cleaning and/or upgrading post-consumer and post-industrial polyvinyl butyral, in particular PVB material having served as interlayer in laminated glass products, wherein the PVB material is provided in flakes, said method comprising the following steps:
   a) —extraction of the PVB flakes in a stepwise manner to reduce or eliminate the content of plasticizers and/or contaminants such as TEG-EH, 2-butoxy-ethanol, butyric acid, and/or butyric aldehyde present in the PVB flakes subjecting the PVB flakes to extraction with pressurized liquid carbon dioxide at a pressure of between 30 and 70 bars, preferably between 40 and 60 bars, and at a temperature between −20° C. to +30° C., and
   b) Optionally repeating the extraction step a) at least once more.

2. The method according to claim 1, wherein the extraction step a) is carried out for 1-15 minutes.

3. The method according to claim 1, wherein the method further comprises a step prior to the step a) of applying a vacuum of 0.001-0.5 bars absolute or below, which is maintained for a period of about 15 seconds to 2 minutes.

4. The method according to claim 1, further comprising varying the pressure during of CO2 during at least one of the extraction steps, by changing the pressure of CO2 with at least +/−0.1 bars-5 bars, during at least one of the extraction steps.

5. The method according to claim 1, wherein the PVB flakes has an average size in which the average length and/or average width is 4-50 mm, such as such as 5-35 mm.

6. The method according to claim 1, wherein the extraction step is repeated at least two times, such as repeated at least 2, 3, 4, 5, 6, 7, 8, 9, 10, 11, 12 times or even more times.

7. The method according to claim 6, wherein the liquid carbon dioxide phase is discharged to a distillation vessel from which purified CO2 is recovered and subsequently recycled into the extraction unit.

8. The method according to claim 1, wherein, the extraction step or steps are carried out in pressure tight rotatable drum, a sealed stirred container, or where the PVB material is stirred by means of the CO2 flow into the sealed container, such as stirring induced by the CO2 flow and/or a fluidized bed within a sealed container.

9. The method according to claim 1, further comprising the further step c) in which the PVB material washed with water adjusted to alkaline pH of at least pH above 8.

10. The method according to claim 9, wherein the alkaline washing step d) is performed prior to and/or subsequent to the CO2- extraction step.

11. The method according to claim 9, wherein the water is adjusted to alkaline pH by adding an inorganic or organic alkaline hydroxide, selected from sodium hydroxide, potassium hydroxide, calcium hydroxide, sodium carbonate, potassium carbonate, ammonia or organic or inorganic amines, and/or mixtures thereof.

12. The method according to claim 1, wherein a drying step is performed after the alkaline washing step or steps.

13. A PVB product obtainable by the method according to claim 1.

14. A PVB cleaning and/or upgrading system for cleaning and upgrading system post-consumer and/or post-industrial polyvinyl butyral, in particular, PVB material having served as interlayer in laminated glass products, wherein the system comprises an extraction station for extraction with liquid or supercritical carbon dioxide having
   a sealable container with means for introducing pressurized liquid carbon dioxide into the container, such as by the sealable container being a rotating drum, in particular, a drum rotating about a horizontal or inclined axis, or by stirring, such as by mechanical stirring means or stirring caused by the flow of liquid carbon dioxide from the pressurized liquid carbon dioxide introduction means,
   transfer means for transferring the pressurized liquid carbon dioxide containing extracted plasticizer and/or contaminants from the container to a distillation unit,
   a distillation unit for separating extracted plasticizer and/or contaminants from the carbon dioxide, by evaporation of the liquefied CO2, and
   pumping means for pressurizing and liquefying of the CO2 evaporated in the distillation unit, and
   recirculation means for recirculating the liquefied and pressurized CO2 to the sealable container.

15. The PVB cleaning and/or upgrading system according to claim 14, further comprising alkaline washing fluid addition means for adding alkaline washing fluid to the pressurized container or to a separate washing means.

* * * * *